US009268749B2

(12) United States Patent
Tealdi et al.

(10) Patent No.: US 9,268,749 B2
(45) Date of Patent: Feb. 23, 2016

(54) INCREMENTAL COMPUTATION OF REPEATS

(71) Applicant: Xerox Corporation, Norwalk, CT (US)

(72) Inventors: Matias D. Tealdi, Cordoba Capital (AR); Matthias Galle, St-Mardin d'Heres (FR)

(73) Assignee: XEROX CORPORATION, Norwalk, CT (US)

( * ) Notice: Subject to any disclaimer, the term of this patent is extended or adjusted under 35 U.S.C. 154(b) by 206 days.

(21) Appl. No.: 14/047,099

(22) Filed: Oct. 7, 2013

(65) Prior Publication Data

US 2015/0100304 A1 Apr. 9, 2015

(51) Int. Cl.
*G06F 17/27* (2006.01)
*G06F 17/22* (2006.01)

(52) U.S. Cl.
CPC ...................... *G06F 17/22* (2013.01)

(58) Field of Classification Search
None
See application file for complete search history.

(56) References Cited

U.S. PATENT DOCUMENTS

| 7,440,461 | B2* | 10/2008 | Sahita et al. | 370/395.32 |
| 7,679,504 | B2* | 3/2010 | Wang et al. | 340/506 |
| 7,769,788 | B2* | 8/2010 | Duxbury | 707/803 |
| 8,495,055 | B2* | 7/2013 | Shmueli | G06F 17/30545 707/714 |
| 8,880,505 | B2* | 11/2014 | Shmueli | G06F 17/30466 707/714 |
| 2007/0239745 | A1 | 10/2007 | Guerraz et al. | |
| 2011/0407011 | | 2/2011 | Perronnin et al. | |
| 2011/0055233 | A1* | 3/2011 | Weber et al. | 707/752 |
| 2011/0103682 | A1 | 5/2011 | Chidlovskii et al. | |
| 2011/0191382 | A1* | 8/2011 | Ghoting et al. | 707/797 |
| 2011/0264997 | A1* | 10/2011 | Mukerjee et al. | 715/256 |
| 2014/0289621 | A1* | 9/2014 | Sivakumar et al. | 715/704 |
| 2015/0161266 | A1* | 6/2015 | Conradt et al. | 707/706 |

OTHER PUBLICATIONS

Apostolico, et al. "Efficient tools for comparative substring analysis" Journal of Biotechnology, 149(3):120-126 (Sep. 2010).
Blumer, et al. "Average sizes of suffix trees and {Dawgs}" Discrete Applied Mathematics, 24(13):37-45 (1989).
Galle, et al. "Searching for compact hierarchical structures in DNA by means of the smallest grammar problem" PhD Thesis, Université de Rennes, pp. 1-151 (Feb. 2011).
Galle, M. "The bag-of-repeats representation of documents" SIGIR, pp. 1053-1056 (Jul.-Aug. 2013).
Gusfield, D. "Algorithms on Strings, Trees, and Sequences: Computer Science and Computational Biology" Cambridge University Press, pp. 143-147 (Jan. 1997).

(Continued)

*Primary Examiner* — Satwant Singh
(74) *Attorney, Agent, or Firm* — Fay Sharpe LLP

(57) ABSTRACT

A method of updating a suffix tree includes providing an initial suffix tree based on a first sequence of symbols drawn from an alphabet. The suffix tree includes existing nodes representing respective subsequences occurring in the first sequence of symbols. The existing nodes are associated with information relating to membership of the subsequences in at least one class of repeat subsequences. A second sequence of symbols is received and the initial suffix tree is updated to form an updated suffix tree by adding new nodes representing subsequences occurring in the second sequence of symbols that are not represented by the existing nodes. The subsequences represented by the new nodes are ordered in a new node data structure which is processed to updating the information relating to the at least one class of repeat subsequences associated with at least some of the nodes in the updated suffix tree.

20 Claims, 9 Drawing Sheets

(56) References Cited

OTHER PUBLICATIONS

Prieur, et al. "On-line construction of compact suffix vectors and maximal repeats" Theoretical computer science, 407(1-3):290-301 (Nov. 2008).

Raffinot, M. "On Maximal repeats in the strings" Information Processing Letters, 80(3):165-169 (2001).

Rivals, et al. "Detection of significant patterns by compression algorithms: the case of approximate tandem repeats in DNA sequences" Bioinformatics, pp. 131-136 (Jan. 1997).

Ukkonen, E. "On-line construction of suffix trees" Algorithmica, 14:249-260 (1995).

U.S. Appl. No. 13/901,736, filed May 24, 2013, Galle.

U.S. Appl. No. 13/765,066, filed Feb. 24, 2013, Galle.

* cited by examiner

INCREMENTAL COMPUTATION OF REPEATS

BACKGROUND

The exemplary embodiment relates to systems and methods for incrementally updating a data structure, such as a tree, to compute repeat subsequences in a sequence of symbols. It finds particular application in representing a textual document using identified repeat subsequences for interpretation of documents, such as classifying the textual document, and comparing or clustering of documents.

Inferring constituents, such as a set of repeated words or sequences of words, is a basic step for many applications involving textual documents. These are the semantic blocks that define the meaning of a document. They can be used to represent the document, and an accurate description of a document is beneficial to tasks such as classification, clustering, topic detection, and knowledge extraction. They are also useful in inferring the structure of a document. In grammatical inference, where it is assumed that the document samples are generated by a grammar, it is also useful to determine which sequences of the document correspond to the same grammatical constituent before detecting how different rules are related to each other.

The standard approach for extracting features and creating representations for textual documents is called the "bag-of-words," where each dimension in a vector space model represents one word. To consider longer sequences, higher level language models, such as n-grams, may be used.

Document processing is often batch mode, but limiting processing to batch mode reduces the application space. For many applications (such as online news analysis, real-time classification, etc.) it is common to have a set of already processed documents $d_1, \ldots, d_k$ to which is added a new document $d_{k+1}$. Despite sophisticated algorithms and implementations, computing the set of repeats in a batch mode on the successive sets $\{d_1\}, \{d_1, d_2\}, \ldots$ is not readily scalable. Additionally, a repeat sequence which is not observed in the original set of documents $\{d_1, \ldots, d_k\}$ may be present later when a further document is added to the collection.

There remains a need for a system and method for detection repeats in a document collection in which the set of documents is not static. For example, documents are added to a pool of documents one at a time or in small batches. The method described permits updating the count of existing repeats, and computing new ones, in such a streaming framework.

INCORPORATION BY REFERENCE

The following references, the disclosures of which are incorporated herein in their entireties, by reference, are mentioned:

U.S. application Ser. No. 13/901,736, filed on May 24, 2013, entitled IDENTIFYING REPEAT SUBSEQUENCES BY LEFT AND RIGHT CONTEXTS, by Matthias Gallé. This disclosure proposed the use of repeats classified by left and right context for natural document representation.

U.S. application Ser. No. 13/765,066, filed on Feb. 12, 2013, entitled BAG-OF-REPEATS REPRESENTATION OF DOCUMENTS, by Matthias Gallé, describes a system and method for representing a document based on repeat subsequences.

The following relate to training a classifier and classification: U.S. Pub. No. 201100407011, entitled TRAINING A CLASSIFIER BY DIMENSION-WISE EMBEDDING OF TRAINING DATA, by Perronnin, et al.; and U.S. Pub. No. 20110103682, entitled MULTI-MODALITY CLASSIFICATION FOR ONE-CLASS CLASSIFICATION IN SOCIAL NETWORKS, by Chidlovskii, et al.

The following relates to a bag-of-words format: U.S. Pub. No. 20070239745, entitled HIERARCHICAL CLUSTERING WITH REAL-TIME UPDATING, by Guerraz, et al.

BRIEF DESCRIPTION

In accordance with one aspect of the exemplary embodiment, a method of incrementally updating a suffix tree includes providing an initial suffix tree based on a first sequence of symbols drawn from an alphabet. The suffix tree includes existing nodes representing respective subsequences occurring in the first sequence of symbols. The existing nodes are associated with information relating to membership of the subsequences in at least one class of repeat subsequences. A second sequence of symbols drawn from the alphabet is received. Based on the second sequence of symbols, the initial suffix tree is updated to form an updated suffix tree, the updating including adding new nodes representing subsequences occurring in the second sequence of symbols that are not represented by the existing nodes. The subsequences represented by the new nodes are ordered in a new node data structure based on at least one of a length of the respective subsequence and a depth of the new node in the updated suffix tree. The new node data structure is processed, the processing including updating the information relating to the at least one class of repeat subsequences associated with at least some of the nodes in the updated suffix tree. At least one of the providing, receiving adding, ordering, and processing may be performed with a computer processor.

In another aspect, a system for updating a suffix tree includes a preprocessor configured for receiving batches of documents and generating respective sequences of symbols drawn from an alphabet based on the documents in the batches. A suffix tree generator generates an initial suffix tree based on a first of the sequences of symbols. The suffix tree includes existing nodes representing respective subsequences occurring in the first sequence of symbols. The existing nodes are associated with information relating to membership of the subsequences in at least one class of repeat subsequences. The suffix tree generator updates the initial suffix tree to form an updated suffix tree based on a second of the sequences of symbols, the updating including adding new nodes representing subsequences occurring in the second sequence of symbols that are not represented by the existing nodes. A cover traverser orders the subsequences represented by the new nodes in a new node data structure and processes the new node data structure. The processing includes updating the information relating to the at least one class of repeat subsequences associated with at least some of the nodes in the updated suffix tree. A computer processor implements the preprocessor, suffix tree generator, and cover traverser.

In another aspect, a method of incrementally updating a suffix tree is provided. The suffix tree includes nodes and has a single root node. Each node is associated with data indicating the membership of the node in a maximal repeat class. Each node further includes a left context data element which holds either a singular left context which is a symbol which appears immediately before a suffix corresponding to the node, no other symbols appearing before the suffix, or a value, referred to as node_maximal, which indicates the node is maximal and there is more than one symbol appearing before the suffix corresponding to the node. The method includes constructing a suffix tree based on at least one already received sequence of symbols drawn from an alphabet, the suffix tree including nodes corresponding to suffixes of the already received sequence of symbols. A new sequence of symbols from the alphabet is received. New nodes are added to the suffix tree based on the new sequence and the new nodes tracked with a new node data structure, each new node of the new nodes corresponding to a suffix of the new sequence. The left context data element of each new node is set to be node__maximal if more than one symbol appears before the suffix corresponding to the new node or the left context data element set to be a symbol which is the only symbol which appears immediately before the suffix corresponding to the new node. Each new node is added to a new node data structure if the new node has a left context data element value of node_maximal. The new nodes are ordered in the new node data structure based on the length of the suffix corresponding to each new node and the ordered new nodes placed in a priority queue. The priority queue is processed until the priority queue is empty, the processing including, if the new node is not the root node and if a parent node of the new node has a left context which is not node_maximal, then the left context is set to node_maximal and the parent node added to the priority queue.

DETAILED DESCRIPTION

Figure 1:
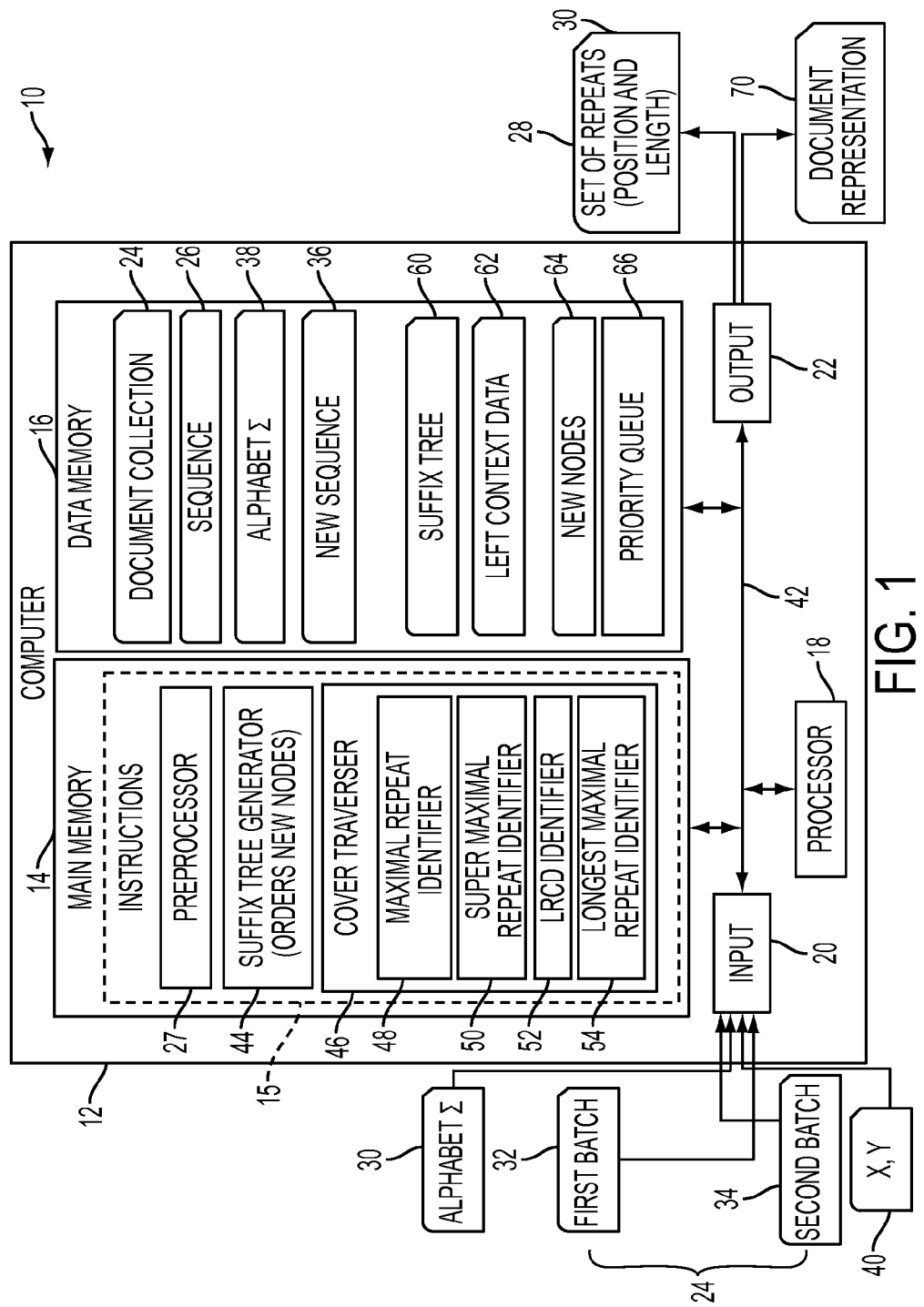
FIG. 1 is a functional block diagram of a system for computing different classes of repeats.

A method and apparatus for computing one or more classes of repeats are disclosed. The method is particularly useful for computing repeats in a streaming framework, where documents (or other sequences of symbols) arrive sequentially, as is often the case in online document processing applications. Several different classes of repeat subsequences ("repeats") are defined by their different properties. The repeats appear in a sequence of symbols, or "string."

A method is provided to update an existing suffix tree based on a new document. Each node of the suffix tree is marked as being part of a set of classes of repeats and contains information on the subsequence the node represents. The method traverses a subset of the nodes of the updated suffix tree (the cover of the new document), which contains all the nodes to be updated. In general, this cover set is seldom more than twice as large as the optimal, meaning that this framework provides a general solution to process documents.

A "repeat" or "repeat subsequence," as used herein, is a subsequence of symbols, the subsequence comprising at least one symbol, and wherein at least two occurrences of the subsequence are present in a sequence of symbols. The exemplary symbols may be drawn from a finite alphabet, which may be a predefined alphabet or may be constructed from a sequence of symbols as the sequence is processed. Examples of symbols include words, single characters, and parts of speech (POS). In the exemplary embodiment, a repeat subsequence is one which occurs at least twice. However, it is also contemplated that a larger number of occurrences may be defined for a subsequence to be considered as a repeat subsequence, such as 3, 4, 5, or more.

In the case of words as symbols, the finite alphabet may consist of all words in the sequence or in a longer sequence which includes the sequence. As an example, the alphabet may include all words (or at least a subset of the words) found in a document or in a collection of documents. Alternatively, a separate dictionary may be provided as the alphabet. In the alphabet, words can be represented by their root (lemma) form. For example, the words present in a document may each be assigned a symbol corresponding to the lemma form of the word.

In the case of characters, the finite alphabet can include the set of letters A to Z or may include additional or different characters, such as the set of ASCII characters or a Unicode character set, or a selected subset of ASCII or Unicode characters, such as all characters found in the sequence (e.g., a document) or a longer sequence comprising the sequence (e.g., a collection of documents). The sequence of symbols may thus represent letters of a string. The alphabet may be known before the documents are processed (predefined by, e.g., a character mapping or encoding) or constructed as the documents are processed.

In the case of parts of speech, the finite alphabet can include parts of speech which can be assigned to one or more words of a text sequence, such as noun, verb, adjective, adverb, noun phrase, and the like. The number of different parts of speech which can be assigned is limited by the number which a natural language parser is able to recognize and can be, for example, from 10-40. For example, the words present in a document may each be assigned a symbol corresponding to its likely part of speech (as assigned by part of speech tagging). Some tokens may be assigned more than one part of speech, and may later be disambiguated, based on contextual information. The tokens may be tagged with the identified parts of speech.

Multiple documents may be combined (by, e.g., concatenation) to form a sequence which is then processed. In the case of words and POS as symbols, the documents considered are textual documents in a natural language, such as English or French, having a grammar. The words represented in the sequence are thus words which are primarily found in a dictionary of one or more languages, or which are proper nouns or named entities which obey the grammar of the language. If multiple documents are combined, a repeat need not be limited to a single document and in general at least some of the repeats have subsequence occurrences in more than one of the documents. Repeats may partially overlap each other. For example if the sequence in the document is represented by the symbols ABCCCCC, then overlapping repeats CCC and CCCC can be found, or in a sequence ACACAC, overlapping repeats of ACA and ACAC can be found.

Each symbol in a sequence is considered to have a left context and a right context. The left context for a given occurrence of a repeat subsequence includes (or is) a symbol which immediately precedes the occurrence of the repeat subsequence in the considered sequence. The right context for a given occurrence of a repeat subsequence includes (or is) a symbol which immediately follows the repeat subsequence in the sequence. For example in the sequence of symbols ACABACAC, the first occurrence of the repeat ACA has a left context which can be defined by a unique symbol, denoted §, that is not found in the document collection (since there is no actual left context in this case) and a right context which is the symbol B. The second occurrence of the repeat ACA has a left context which is the symbol B and a right context which is the symbol C. In one embodiment, left and right contexts are both exactly one symbol in length.

The terms left and right refer to the respective positions in the sequence in the reading order of the sequence (or vice versa). For sequences arranged vertically rather than horizontally, left and right contexts can be considered as top and bottom contexts (or vice versa).

The following notation will be used:

A sequence S is a concatenation of atomic symbols s[1] . . . s[n] in which each symbol is a member of an alphabet Σ (that is: s[i] ∈σ). The length of S, denoted |s|, is the number of symbols, generally denoted by n. A subsequence of symbols ω is said to occur in S at position m if ω[i]=s[m+i] for i=1 . . . |ω|. The set of occurrences of subsequence ω in S is denoted by $occ_s(\omega)$ (or just occ(ω) if S is clear from the context). If $occ_s(\omega)) \geq 2$, ω is called a repeat in S and $\mathcal{R}$ (S) is the set of all repeats of the sequence S. Alternatively, if w occurs in S at some position it is also said that w ∈S.

For convenience, it may be supposed that sequence S starts and ends with different unique symbols that are not present in the alphabet ($S[0]=\S_1, S[n+1]=\S_2, \S_1 \neq \S_2$ and $\S_1, \S_2 \notin \Sigma$). In the following explanation, instead of working with a set of documents, the documents are concatenated into one combined sequence, separating documents with unique symbols. The concatenation $d_1.d_2$ is defined as the sequence $d_1 \S d_2$ of size $|d_1|+|d_2|+1$, where § is a new symbol, not appearing in $d_1$ or $d_2$. A collection of documents $D=\{d_1, d_2, d_3, \ldots d_k\}$ will therefore be represented as one larger string $S=d_1.d_2.d_3 \ldots d_k$, in which the separating symbols § prevent repeats from spanning over document boundaries (each "." operation adds a fresh separating symbol).

The size (cardinality) $lc_s(\omega)$ of the left context (right context $rc_s(\omega)$) of a subsequence ω in S is defined as the number of different symbols appearing immediately to the left (resp. right) of all occurrences of ω:

$$lc_s(\omega) = |\{s[i-1]: i \in occ(\omega)\}|$$

$$rc_s(\omega) = \{s[i+|\omega|]: i \in occ(\omega)\}|$$

As an example, consider the characters in the word bananas as a sequence S of symbols. The symbol a is a repeat subsequence ω in bananas because it occurs at least twice. The left context of the subsequence a in the word bananas has a cardinality (or size) of 2. This is because two different characters appear to the left of the occurrences of a, which are b and n. The size of the right context of a is also 2, and the corresponding characters are n and s.

For a number of applications, normal repeats are not very useful because of their high redundancy. It is useful to focus on special classes of repeats which limit the possible universe of repeats. The present embodiment focuses on four classes of repeats: maximal repeats, super-maximal repeats, LRCD repeats, and largest-maximal repeats. The set of these repeats for a sequence S will be denoted respectively as MR(S), SMR(S), $CD_{l,r}(S)$, and LMR(S). As will be appreciated, the method is not limited to these classes of repeats and can consider fewer, more or different classes of repeats.

Repeats can be characterized by the size of their contexts.

A maximal repeat MR(S), is defined as a repeat ω which cannot be extended without losing support (number of occurrences). That is, there is no subsequence aω or ωa, where a is a given character, that appears the same number of times as ω. Alternatively, ω is a maximal repeat if and only if (iff) there is no other repeat ω' such that ω occurs in ω' and |occ(ω)|=|occ (ω')|. The number of maximal repeats grows linearly with the size of the sequence, although their total number of occurrences can still be quadratic. Equivalently, this means that the size of both its right and left contexts have to be greater than 1. In the above notation: a repeat ω is a maximal repeat in s iff $lc_s(\omega), rc_s(\omega) \geq 2$.

In the above bananas example, a is a maximal repeat (both contexts have a size of 2). As a counter example, n is a repeat but is not a maximal repeat since the right and left contexts of n are both 1 in size. This implies that it is possible to extend the subsequence n without reducing the number of its occurrences. Specifically, the subsequences an, na, and ana all repeat twice (the same number of times as n) and are longer than n. Note that in this simplified example, both the left and right contexts are 1 in size, but the contexts need not both be both 1. For example, in the word bandana, the left context of n is size 1 and the right context is size 2. The subsequence n can still be extended to a longer subsequence an while maintaining the same number of repeats.

A largest-maximal repeat LMR(S) (sometimes called a near-supermaximal repeat) is a repeat which has at least one occurrence that is not strictly included in another occurrence. Formally, ω is a largest-maximal repeat iff there do not exist any other repeats $\omega_1, \ldots \omega_k$ such that ω occurs in all of them and $pos(\omega \subseteq \cup_{i=1}^{k} pos(\omega_i)$, where $pos(\omega)=\cup_{i \in occ(\omega)} \{i, \ldots, i+|\omega|\}$, the set of positions that ω covers over the sequence. These repeats thus require at least one occurrence with a right (or left) context that is different from all right (or left) contexts of remaining occurrences. Largest-maximal repeats are a subset of maximal repeats and therefore linear. The total number of occurrences grows at least as $$\Omega(n^{\frac{3}{2}}),$$

although a tight bound is unknown.

A super-maximal repeat SMR(S) is defined herein as a repeat that is not a subsequence of any other repeat. It is characterized as having no right or left context repeated in the sequence. Each repeat has a unique left and right context. In the above notation: A repeat ω is super-maximal in S iff $lc_s(\omega) = rc_s(\omega) = |occ(\omega)|$.

The total number of occurrences of super-maximal repeat is linear. In the sequence bananas, an example of a super-maximal repeat is ana, since it occurs twice (overlapping), having a left and right context sizes of 2 (left characters b and n, right characters n and s).

A left, right context diverse repeat LRCD or $CD_{l,r}(S)$ is defined herein as follows: a repeat ω is both left and right context diverse in S if the number of its different right contexts $rc(\omega) \geq x$ and if the number of its different left contexts $lc(\omega) \geq x$. In words, the $CD_{l,r}(S)$ repeat is defined by the size of its left and right contexts. More formally:

A subsequence ω is x-left-context-diverse (xlcd) in S if $lc(\omega) \geq x$.

A subsequence ω is y-right-context-diverse (yrcd) in S if $rc(\omega) \geq y$.

A subsequence ω is ⟨x,y⟩-LRCD, in S, i.e., $CD_{l,r}(S)$ if it is both xlcd and yrcd.

It may be noted from the above definitions that:

1. A word ω is a maximal repeat in S iff it is ⟨2,2⟩-context-diverse.

2. A word ω is a super-maximal repeat in S iff it is ⟨|occ (ω)|, |occ(ω)|⟩-context-diverse.

x and y are predefined and can each be equal to or greater than 1 or equal to or greater than 2. Note that x and y will, in general, be constant integers, which may be the same or different, but that they may also be more advanced functions. For example, w is a super-maximal repeat iff w is a $\langle |occ(w)|, |occ(w)| \rangle$ -cd repeat. In the following it will be assumed that x,y≥2. This means that generally, $CD_{l,r}(S)$ repeats will also be maximal repeats.

An advantage of the exemplary LRCD-repeats is that they are relatively sparse and simple to compute. From the linearity of right- and left-maximal repeats, it can be seen that the number of $CD_{l,r}(S)$ repeats is $O(n)$ iff max(x,y)≥2. It is $O(n^2)$ otherwise.

The class of $CD_{l,r}(S)$ repeats provides a range of repeats between the extremes of super-maximal and maximal.

Largest-maximal repeats cannot be captured strictly by the size or their contexts or in terms of $CD_{l,r}(S)$-repeats. Largest-maximal repeats require at least one occurrence with a right (or left) context that is different from all right (or left) contexts of remaining occurrences. Such context-uniqueness is not captured with the rc and lc functions.

One or more of these sets of repeats, such as the set of $CD_{l,r}(S)$ repeats which satisfy the preselected values of x and y, can be identified in a document (or in a document collection of two or more documents) and can be used to characterize the document (or any one or more of the documents in the collection). Representing a document based on the occurrence of these and/or other types of repeats can be used for a variety of purposes, such as document clustering, similarity computation, document retrieval, and the like.

As an example, consider the sequence dabWabXacYacZdab. The only super-maximal repeats here are ac and dab. In addition to these, ab is also a largest-maximal repeat because it appears once without any other repeat covering it. It has two different left context (d and W, and three different right context: W, X, §) and is therefore a $CD_{2,3}(S)$ repeat (and in general an x, y-left, right context diverse repeat for x≤2 and y≤3). Finally, a is also a maximal repeat as there is no other repeat that contains it and has the same support.

A "suffix," as used herein, is a contiguous subsequence of one or more symbols in the sequence S which terminates at the end of the sequence and which can include from 0 to all symbols in the sequence. In the exemplary embodiment a special symbol § is used at the end of the sequence to ease computation. For example, in the sequence bananas§, where § is the separator, the set of suffixes is bananas§, ananas§, nanas§, anas§, nas§, as§, s§, and §.

A "prefix," as used herein, is a contiguous subsequence of one or more symbols of the respective suffix, beginning with the first symbol in the suffix. The longest suffix is the length of the entire sequence (plus the termination character). The separator character § may also be used to separate concatenated documents. The separator character may be another instance of a context if a repeat occurs at the beginning or end of a sequence. For example, given the suffix ananas§, the set of possible prefixes is ananas§, ananas, anana, anan, ana, an, and a.

The term affix refers to a selected one of a prefix and a suffix. An affix data structure refers to a stored structure, such as a tree, in which the selected one of the prefix and suffix subsequences of the sequence S are represented. While the exemplary embodiment focuses on a data structure that is based on suffixes, it is to be appreciated that the system and method are also amenable to the case of prefixes. Moreover, if the sequence is considered in reverse order, the suffix tree generated corresponds to a prefix tree. Thus the terms suffix data structure and suffix tree cover can be considered as referring to either affix.

FIG. 1 illustrates an exemplary computer implemented system 10 for identifying different types of repeats. The system 10 includes a computer 12 with main memory 14 and data memory 16. The memory 14 stores instructions 15 for performing the exemplary method described in FIGS. 3 and 4. A digital processor 18, in addition to controlling operation of the computer 12, executes the instructions 15 stored in memory 14.

The computer 12 may include one or more dedicated or general purpose computing devices, such a server computer or a desktop or laptop computer with an associated display device and a user input device, such as a keyboard and/or cursor control device (not shown), or any suitable computing device capable of implementing the method. The memories 14, 16 may be separate or combined and may represent any type of computer readable memory such as random access memory (RAM), read only memory (ROM), magnetic disk or tape, optical flash, flash memory, or holographic memory. In one embodiment, the memory 14, 16 comprises a combination of random access memory and read only memory. The digital processor 18 can be variously embodied, such as by a single-core processor, a dual-core processor (or more generally by a multiple-core-processor), a digital processor and cooperating math coprocessor, a digital controller, and the like.

The term "software" as used herein is intended to encompass any collection or set of instructions executable by a computer or other digital system so as to configure the computer or other digital system to perform the task that is the intent of the software. The term "software" as used herein is intended to encompass such instructions stored in the storage medium such as RAM, a hard disk, optical disk, or so forth, as is also intend to encompass so-called "firmware" that is software stored on a ROM or so forth. Such software may be organized in various ways, and may include software components organized as libraries, Internet-based programs stored on a remote server or so forth, source code, interpretive code, directly executable code, and so forth. It is contemplated that the software may invoke system-level code or calls to other software residing on a server or other location to perform certain functions.

The illustrated computer 12 includes input and output interfaces 20, 22. The input interface may receive a collection of documents 24, such as newspaper articles, OCRed forms, or the like, as a set of two or more batches of documents, each batch including at least one document. The collection of documents 24 may be translated into a sequence 26 of symbols by a preprocessor 27. The sequences 26, e.g., one sequence per document, may be extracted externally or by the system and may be concatenated to form a single sequence for the collection at a given time t. The symbols, in this case, can be words (optionally lemmatized), characters, or POS. The output interface 22 outputs information 28, based on the application of the instructions 15. The information output may include a set 30 of repeats generated by the system. In the exemplary embodiment, the set 30 of repeats consists of or includes different types of repeats. Other information 28 which is output may be based on the identified repeats. For example, a label may be output for a given document that is applied by a trained classifier based on the identified repeats in the document. In other embodiments, a cluster of documents is output or a set of documents similar to a selected document, or the like.

In the exemplary embodiment the document collection 24 is received in batches, each batch including at least one document. A first batch 32 is received at a first time and a second batch 34 is received at a second, later time, and so on. The documents in the first batch are translated into a first sequence 26 by the preprocessor 27. The documents in the second batch are combined with the documents in the first batch and translated into a second sequence 36 by the preprocessor 27. Alternatively, each new document may come already encoded as a sequence of symbols. As the embodiment described below is for incremental processing, the documents in the document collection 24 may be received one at a time or in small batches. The new document(s) 34 is/are the most recently received document(s).

The input documents 24 or sequences 26 may use symbols drawn from a predefined alphabet 38, or the alphabet may be constructed as the documents in the collection 24 are processed and stored in memory 16. Other information may be received and stored to indicate which types of repeats are to be identified. For example, provision may be made for a user to input information 40 indicating which types of repeats are of interest and associated information such as selected values of x and y which specify the threshold number of different left and right contexts that an $CD_{l,r}(S)$ repeat must have to be included in the set 30. The user may be limited to a predefined range, such as selecting from 1-20 or from 1-10 for each of x and y. In some embodiments, at least one or both of x and y may be required to be at least 2. In some embodiments, at least one or both of x and y is at least 3 or at least 5. In some embodiments, y>x. In some embodiments, y is at least 2x. In some embodiments, x+y>5. Suitable values of x and y may also depend on the likelihood that repeats will be found. In one embodiment, suitable values of x and y are predetermined from training data, for example, values which tend to provide $\langle x,y \rangle$-LRCD representations of documents that are useful for a particular processing task. The system returns repeat subsequences that satisfy the specified conditions, e.g., the threshold of left and right context diversity x and y. The specified repeats can have the same number or a greater number of different contexts than the specified values. In the exemplary embodiment, no maximum is set on the number of different left and/or right contexts that a given $CD_{l,r}(S)$ can be found in, although this is not excluded.

Exemplary input and output interfaces 20, 22 include wired and wireless network interfaces, such as modems, or local interfaces, such as USB ports, disk drives, and the like. Components 14, 16, 18, 20, and 22 of the computer are communicatively interconnected by a data/control bus 42.

In one embodiment, the computer 12 is configured by suitable programming software (e.g., instructions 15) and/or firmware to embody a preprocessor component 27, a suffix tree generator 44 (which enumerates new nodes and includes a component to order the new nodes), and a cover traverser 46. The cover traverser includes rules for identifying at least one type of repeat, such as at least one of the four types of repeats described above. In the illustrated embodiment, these include a maximal repeat identifier 48, a super maximal repeat identifier 50, an LRCD identifier 52, and a longest maximal repeat identifier 54, which include respective rules for identifying that type of repeat.

The preprocessor 27 parses the input first batch of documents 32, and each subsequent batch 34, by employing a grammar or other processing technique. For example, the preprocessor 27 may reduce all the words in the collection of documents to a normalized form, such as a lemmatized, lowercase form. Plural nouns are replaced by the singular form and verbs by the infinitive form. Punctuation may be stripped from the sequence. Words may also be processed to identify their part of speech, by part-of-speech (POS) tagging. If an alphabet 38 is not input or the same as used natively by system 10, the preprocessor 27 may, before or after pre-processing, generate an alphabet 38 which includes all the symbols found within the collection of documents 24 up to that time. Preprocessor 27 may also concatenate the documents, separating them by a respective unique separator character §.

Data memory 16 stores the input document collection 24, sequences 26, and alphabet 38. Data memory 16 also stores data generated by the software components in main memory 14, such as an affix data structure 60, such as a suffix tree, left context data 62 (in the case of a suffix tree), a data structure 64 which stores new nodes (or pointers or references into the suffix tree 60), and a priority queue 66, which are explained in further detail below.

The suffix tree 60 stores data associated with each node, such as the left context data 66 for a suffix corresponding to each node. Data memory 16 also stores various local variables used by the separate modules which are omitted for clarity.

A predefined lexicographical sorting order is provided that orders the symbols in the alphabet 38, such that the sequences of symbols forming the suffixes can be sorted based on that order. In the case of characters as symbols, the order from A to Z can be followed, optionally with other characters, such as numbers, following in a predefined order. In the case of words as symbols, the lexicographical sorting order may correspond to the order found in a dictionary, such that the first character is considered first, then the second, and so on, e.g., the symbol act appears in lexicographical order before ape. In the case of parts of speech, any predefined order can be selected as the lexicographical order, such as Noun, Verb, Adjective . . . , and so forth.

More formally, an order $\prec$ is defined over the alphabet $\Sigma$. The lexicographical extension $\Sigma^*$ to $\Sigma$ will also be denoted by $\prec$. For the sequence S of length n symbols, let $\tilde{S}=S\S$, with the special character § not contained in $\Sigma$ being ordered earlier than every element of $\Sigma$ by $\prec$. A data structure may then be constructed using the predefined order $\prec$ on the sequence, such as suffix tree 60.

The suffix tree 60, denoted τ for an n-character string S is a rooted directed tree which includes a set of internal nodes connected directly or indirectly by edges to a root node. The suffix tree terminates in exactly n leaves, which can be numbered 1 to n. The n-characters may include the termination character §. A leaf can be considered as a node without children. Each internal node, other than the root, has at least two children and each edge is labeled with a nonempty substring of S. No two edges from a node can have edge-labels beginning with the same character. A key feature of the suffix tree is that for any leaf i, the concatenation of the edge-labels on the path from the root to leaf i exactly spells out the suffix of S that starts at position i. That, is, it spells out S[i . . . n].

To avoid the problem of a suffix of S matching a prefix of another suffix of S, a special last character § is appended to every sequence S. The character § is a new unique character which appears nowhere else in S. It may be implemented as, for example, a null terminator or by using a string length.

Figure 2:
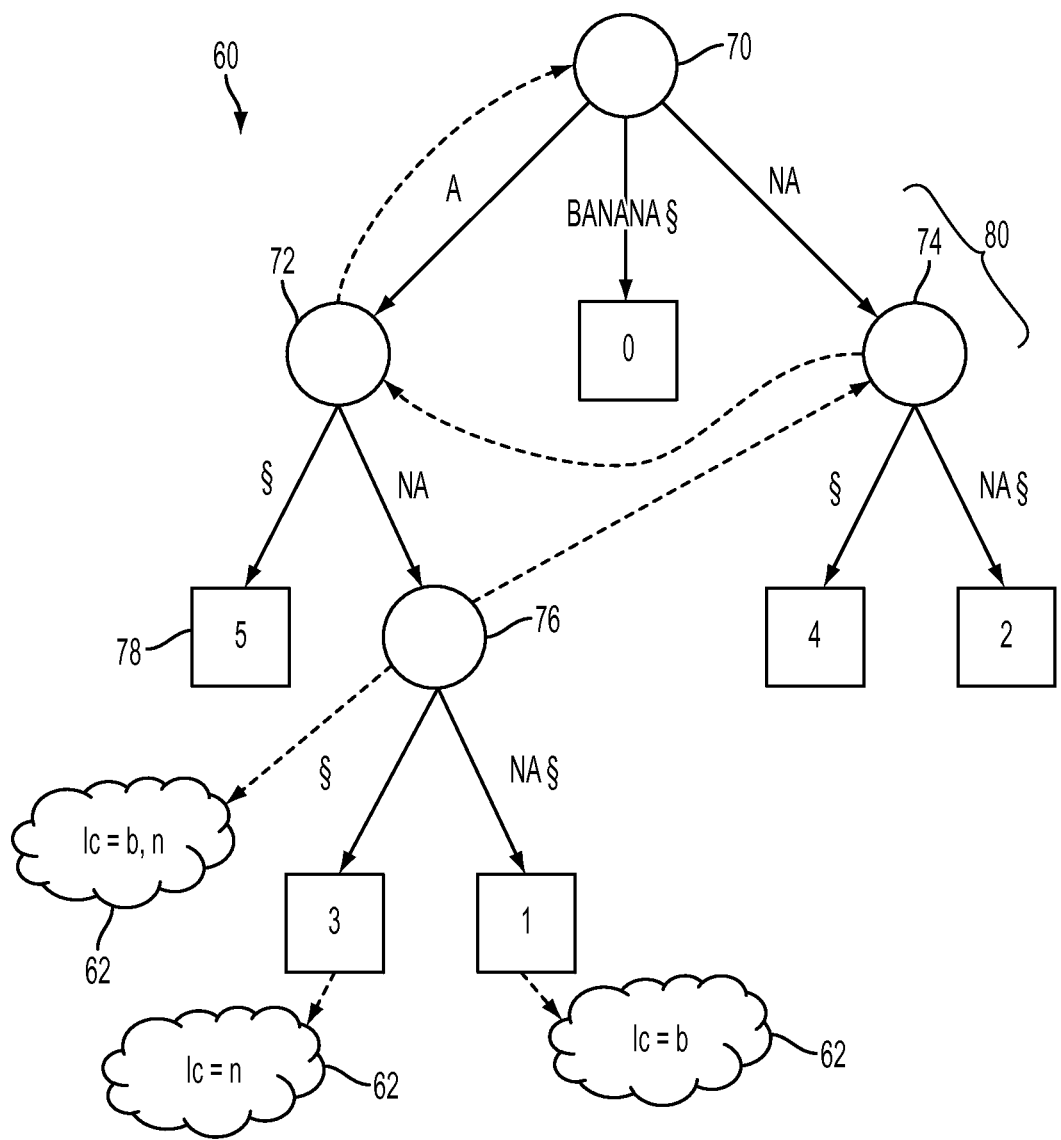
FIG. 2 is a graphic representation of a tree data structure for use in computing different classes of repeats.

FIG. 2 presents an example of a suffix tree 60 for the string banana§. There is one root node 70, three internal nodes 72, 74, 76 (node 76 is a child of node 72), and six leaves 78, numbered 0 to 5. An example path 80 connects the root 70 to the leaf numbered 2. Any node (including the leaves 78) in the suffix tree 60 of S represents a substring of S, which is the concatenation, in order, of the substrings labeling the edges of the path that joins the node to the root. In the explanation below, a node v and the corresponding substring represented by v are used interchangeably.

Every internal node 72, 74, 76 of the suffix tree 60 represents a repeated substring in S with two or more different right contexts. This makes this particular repeat right-maximal. For example node 72, which corresponds to the substring a has two different right contexts § and n and node 76, which corresponds to the substring ana, has two different right contexts § and n, which occur as the first symbol of their respective edges.

The number of leaves descending from a given node is the number of occurrences of this substring. For example, node 72 has three leaves as descendants (numbered 1, 3, and 5), and there are three occurrences of the letter a in the sequence banana§. Each leaf 78 represents a suffix of S and every node above (higher in the tree than) that leaf along the path to the root represents a prefix of this suffix. For example in the case of the leaf numbered 1, it corresponds to the suffix anana§, and its parent node 76 to ana, which is a prefix of anana§, and its grandparent node 72 corresponds to a, which is also a prefix of anana§.

In one embodiment, repeats of interest correspond to nodes of the suffix tree or one or more special subsets of these nodes, i.e., fewer than all the internal nodes in the suffix tree, corresponding to one of the four classes of repeats exemplified above. However, the tree structure enables retrieval of all repeats from the set of the nodes, with the additional advantage that the number of nodes in a suffix tree is linear in the length of the underlying sequence. For each of the defined classes of repeats, there is a characterization of the subset of the nodes of the suffix tree which captures all members of the repeat class.

In the exemplary embodiment, each right-maximal repeat is a node of the suffix tree, and as only subsets of maximal repeats are considered, all members of any class are represented by one internal node of the suffix tree. However since the tree is a suffix tree, the left context is not encoded by the node. For each suffix, therefore the left context can be tracked in additional data associated with each node as left context data 62. The right context is supplied by the tree itself because the child nodes provide the right context. For any leaf v of the suffix tree, that represents the suffix of S at position i, the left-character of v (denoted lc(v)) is the character S[i−1]. For any internal node above v, lc(v) denotes the set containing the left context of its descendants. Each descendant is or ultimately terminates in a leaf, so each descendant corresponds to some leaf node v:

$lc(v) = \{c : \exists w : \text{leaf under } v \wedge c = lc(w)\}$.

This leads to the following node properties for the repeat classes:

(1) An internal node v is a maximal repeat if the number of different left contexts (stored in data 62) is greater than 1 ($|lc(v)| > 1$)

(2) An internal node v is a super-maximal repeat if all its children are leaves, and they all have different left contexts ($|children(v)| = |lc(v)|$)

(3) An internal node v is a largest-maximal repeat if at has at least one leaf-child w and the left-context of this leaf is different from all other children of v ($lc(w) \notin \{lc(v') : v' \in children(v) \setminus \{w\}\}$)

(4) An internal node v is $\langle l, r \rangle$-context diverse ($CD_{l,r}(S)$) if $|lc(v)| \geq x$ and $|children(v)| \geq y$ As an example of case (1), node 76 in FIG. 2, corresponding to subsequence ana is associated in the data structure 62 with the information that it has two left contexts b and n and is thus recognizable as a maximal repeat. All its children are leaves, and they have different left contexts n and b, so under (2) node 76 is also a super-maximal repeat. It is also a largest-maximal repeat under (3) since both its leaves have different left contexts. In the case where x and y are selected as 2 and 3, respectively, the data structure 62 indicates that node 76 has two different left contexts b and n, but only two children, numbered 1 and 3, so this node would not class as a left right context diverse $CD_{l,r}(S)$ under this rule.

The queue 66 is used by the cover traverser in the process of updating the affix data structure 60 and associated left context data 62 when a new document or documents is/are added to sequence S. is a first in first out (FIFO) data structure storing elements which can be added to the queue by a "push" operation and retrieved by a "pop" operation. The queue also supports a "top" operation (sometimes called "peek") to access the next element to be popped (the element at the front of the queue which is also the oldest element in the queue) without removing it from the queue. The queue used in the present embodiment also checks if an element has already been added to the queue, and, if so, does not change that queue. Duplicates are not added nor do they change the order of the queue. This makes the push operation more expensive in time but can be avoided by trading off memory, as discussed below.

While particular reference has been made herein to letters as symbols, it is to be appreciated that words may be considered as the symbols of the sequence S. In some embodiments, the sequences or documents may be stripped of punctuation (or punctuation simply ignored). The input may also be other than words or documents. The input may be, for example, a gene sequence.

Figure 3:
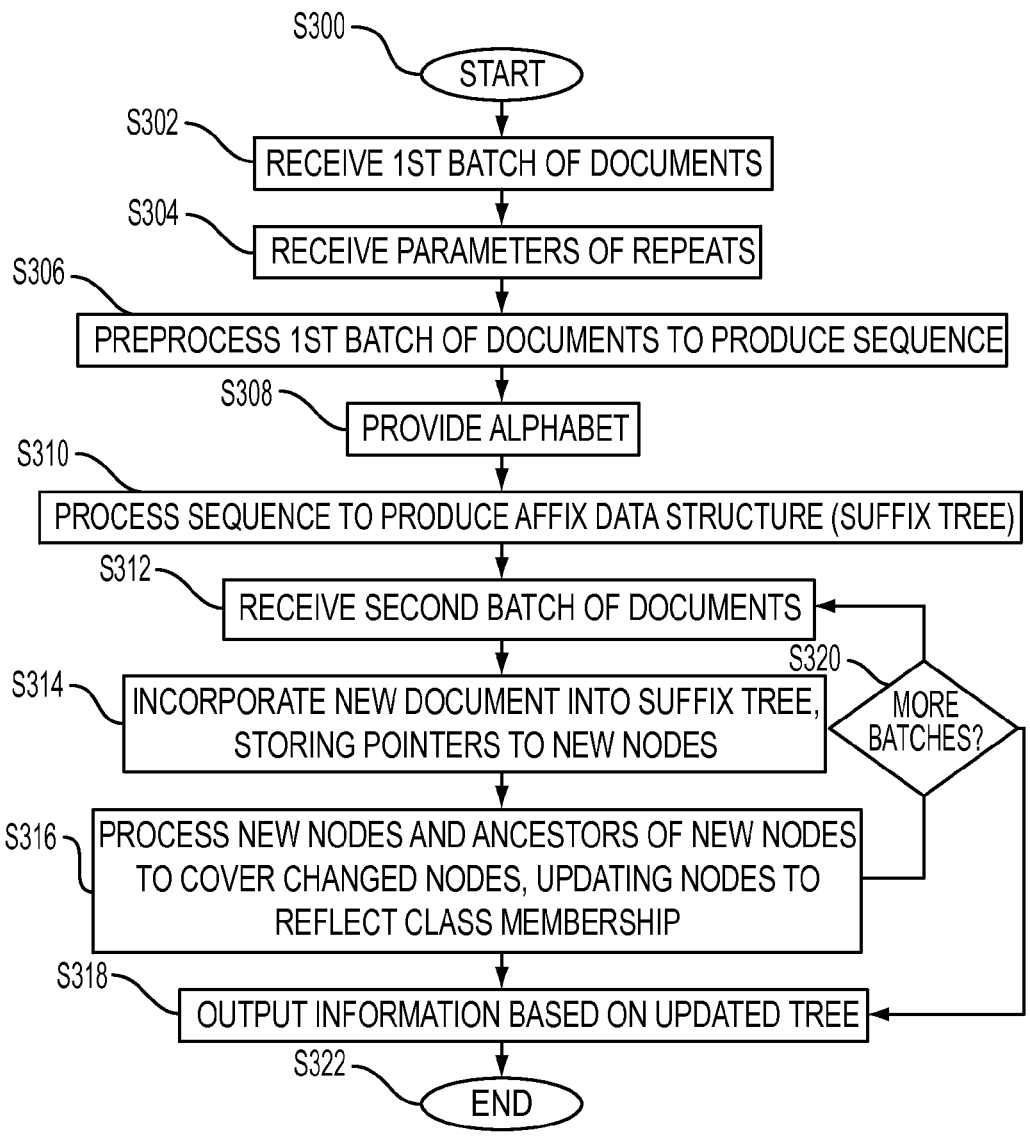
FIGS. 3 and 4 are flow charts illustrating a method for identifying different classes of repeats.

With reference now to FIG. 3, a computer implemented method for constructing an affix data structure 60 and updating the data structure as new documents are received, which may be performed by the system of FIG. 1, will be described.

The exemplary method iteratively constructs a suffix tree 60 and extends this data structure with additional information for each node. The generic method can be extended with additional information for each type of repeat. After adding one or more new documents, the additional information is sufficient to compute several different classes of repeats. Furthermore, the additional information can be maintained efficiently in a streaming environment. The exemplary method permits updates to the information for computing four classes of repeats: maximal, largest-maximal, super-maximal and context-diverse repeats in the sequence. The exemplary method described herein is an (asymptotically) optimal algorithm for the case of maximal repeats. The exemplary method updates the number of occurrences of all repeats, regardless of their class.

In one embodiment, Ukkonen's online suffix tree construction algorithm is used to construct the suffix tree 60, which constructs of the suffix tree incrementally, character by character (see, Esko Ukkonen. On-line construction of suffix trees. *Algorithmica*, 14:249-260, 1995). The complexity of running this algorithm on a sequential representation of the document set $D = \{d_1, d_2, d_3, \ldots d_k\}$ is therefore $\mathcal{O}(N)$ with $N = k + \sum_{i=1}^{k} |d_i|$. Moreover, using the fact that each document is separated with a single unique character and the analysis of complexity of the algorithm, it can be seen that the complexity of adding a new document $d_{k+1}$ is $\mathcal{O}(|d_{k+1}|)$.

Instead of computing the repeats directly from the sequence, an efficient algorithm pre-computes a data structure operating as an index and the method then operates on this index. Index structures include those from the suffix family (suffix tree, array, vector, directed acyclic word graph). The present embodiment uses a suffix tree, since the Ukkonen algorithm can be used to compute it. Those skilled in the art will understand that the different data structures can be used to implement the method, and use of such alternative data structures is contemplated.

The method begins at S300 of FIG. 3.

At S302, a first batch of documents 32 is received by the system 10, and may be stored in memory 16.

At S304, parameters of the repeats sought are received by the system. The parameters may include which classes of repeats are desired (such as one or more of maximal repeats, super-maximal repeats, LRCD repeats, and largest-maximal repeats), if this has not been already determined, and, the case of LRCD repeats, parameters x and y.

At S306, the first batch of documents 32 is processed, e.g., by the preprocessor 38. This may include OCR processing of the documents, if not in text format, lemmatizing words and/or identifying parts of speech, and inserting special character § between documents. Alternatively, the preprocessing step may be omitted if the first batch of documents 32 is already in the form of a sequence S 26.

At S308, an alphabet is provided. In one embodiment, the sequence is processed by the preprocessor 38 to produce the alphabet Σ 30. The alphabet may consist of all symbols occurring in the sequence. The special character is not a member of alphabet Σ 30. Alternatively, alphabet Σ 30 may be predefined.

At S310, the sequence 26 is processed, by the suffix tree generator 44, to produce a suffix tree 60, and left context data 62 is identified and associated with each node. The suffix tree generator is suited to running on the documents in the document collection (or the sequences generated from them) one at a time or, alternatively, the initial batch of documents may be processed as a whole. The underlying algorithm (Ukkonen's) is incremental and may be run either way.

At S312, a new batch of documents 34 is received. The document(s) in the batch may be preprocessed, as at S306, to form a new sequence 36 that is based only on the added document sequence(s), with spacing symbols §, as discussed above.

At S314, the new sequence 36 is incorporated into the suffix tree 60, e.g., using Ukkonen's algorithm. As it is incorporated, newly added nodes 64 are tracked in a data structure, such as a queue or list. The new nodes may be ordered by length as they are added to the data structure or after the new sequence 36 has been completely processed. The ordered new nodes are stored in priority queue 66. None of the new nodes is repeated. The priority queue is a special priority queue in that it checks for repeat subsequences and does not add a node if it is already in the queue. This check may be turned off (not performed) while adding the new nodes, as it is unnecessary. The check is used, however, for step S316.

After the new nodes are ordered according to length, processing proceeds to S316, where the new nodes are processed in order from longest suffix (deepest in the tree) to shortest suffix. As each node is processed, its parent is stored in a priority queue data structure, allowing the entire cover of the new sequence 36 to be processed. The properties of the node are checked and its membership in at least one of the four repeat classes is updated. As discussed above, the priority queue should eliminate duplicates to avoid covering the same node twice. The details of step S316 are discussed in further detail with respect to FIG. 4.

At step S318, information may be output. This may include one or more of: the updated tree, membership in at least one of the (four) repeat classes, and a classification of the collection or a document in the collection based on the identified repeats of each class.

In one embodiment, the method proceeds to S320 to await new batches and if a new batch is received, returns to S312. Step S318 may be performed, for example on request of a user at any time subsequent to receiving a second, third, or any number of document batches.

The method ends at S322.

The exemplary method to identify classes of repeats incrementally (S314 and S316) is the following:

For a class of repeats X, and given documents $D=\{d_1 \ldots d_k\}$, document $d_{k+1}$ and a suffix tree on $S=d_1.d_2 \ldots d_k$ where all nodes corresponding to $X(S)$ are marked (all nodes are marked with whether or not they are in a particular set of repeats), return a suffix tree on $S.d_{k+1}$ such that all nodes corresponding to $X(S.d_{k+1})$ are marked (S314).

While it may be desirable for an algorithm solving this problem to run in time proportional to $d_{k+1}$, however, this is often not possible because the number of nodes to be (un-)marked could be larger than this. Therefore, a method which (un-)marks the tree is called optimal if it runs in time $\mathcal{O}$ (max (n, $|X_{diff}(S,d)|$)), where $X_{diff}(S,d)$ are the changes of node marking marker which must be performed:

$$X_{diff}(S,d)=(X(S\cdot d)\backslash X(S))\cup (X(S)\backslash X(S\cdot d)).$$

One exemplary method works for all four classes of repeats in non-optimal time. Another exemplary method, modified for maximal repeats only, runs in optimal time.

Note that returning a tree in which $X(S.d_{k+1})$ are marked only marks the corresponding repeats, but does not provide any other information, such as number of occurrences of each. Providing further information potentially requires traversing the whole suffix tree, incurring an additional penalty of N after each increment. Therefore, the number of occurrences of each class of repeat is also computed and updated in the method.

Given documents $D=\{d_1 \ldots d_k\}$, document $d_{k+1}$ and an initial suffix tree 60 on $S=d_1.d_2 \ldots d_k$ where all nodes are annotated with their total number of occurrences of each class of repeat, a suffix tree on $S.d_{k+1}$ is returned such that all nodes are updated with their corresponding number of occurrences.

A method for solving this problem is said to be optimal if it runs in time $\mathcal{O}$ (max(n, $|X_{update}(S,d)|$), where $X_{update}(S,d)$ are the updates that have to performed: $X_{update}(S,d)=\{w\in d: w\in d)\}\cup (X(S)\backslash X(S.d))$. Note that the size of this set can be much larger than the length of the newly added document(s). For example, maximal repeats may be on the order of the square of the size of d:

$$|MR_{update}(S,d)|\in \Theta(|d|^2)$$

To illustrate this, a document could be selected where every substring is different and a maximal repeat. As there is no bound on the number of documents that appeared previously, this can always be achieved.

In addition to computing the changes to the tree when a new document $d_{k+1}$ is added to S, the different classes of repeats that each node belongs to are also updated (S316). The new suffix tree $\tau_{k+1}$ will have $|d_{k+1}|+1$ leaves corresponding to each of the suffixes of $d_{k+1}$. As stated above, any occurrence of a substring w in $d_{k+1}$ can potentially affect the membership of a substring w in one of the repeat classes that have been predefined. This may be because it is repeated for the first time or because of a change in its context sets. Therefore, this set of suffix strings is traversed after each new (batch of) document(s) is added. The set of substrings of $d_{k+1}$ which are right-maximal repeats in $S.d_{k+1}$ is denoted as Cover $(S,d_{k+1})$. This corresponds to the internal nodes of $\tau_{k+1}$ which are ancestors of leaves added to the tree 60 when $d_{k+1}$ was processed.

For efficiency, the cover set should not be traversed in an arbitrary order. Any information on the occurrence of an internal node v can be obtained by aggregating the same information of the children of v. Hence, in the exemplary embodiment, each node is visited only once, and that occurs only after all of its children have been visited. This can be performed by ordering the nodes with respect to the lengths of their represented substring. That is, the longest substrings are visited first (leaves, parents of leaves, etc.). For any node v in a suffix tree, the depth of v is the number of characters in the substring represented by v. This provides a partial order on the nodes of the suffix tree, where v<w iff v is a prefix of w and depth(v)<depth(w).

Algorithm 1 provides a method for traversing the tree to update the nodes when a new document d has been incorporated into the suffix tree.

---

Agorithm 1: Traversing of cover(S, d)

cover (S, d)
[1] pq: = priority queue
[2] for v leaf corresponding to suffix starting in d do
    pq. push(v)
end for
while¬pq. empty( )
    v: = pq. top( )
    pq. pop ( )
    if v = root then
        continue
    end if
        process(v) //do something with v
        pq. insert(v. parent)
end while

---

Figure 4:
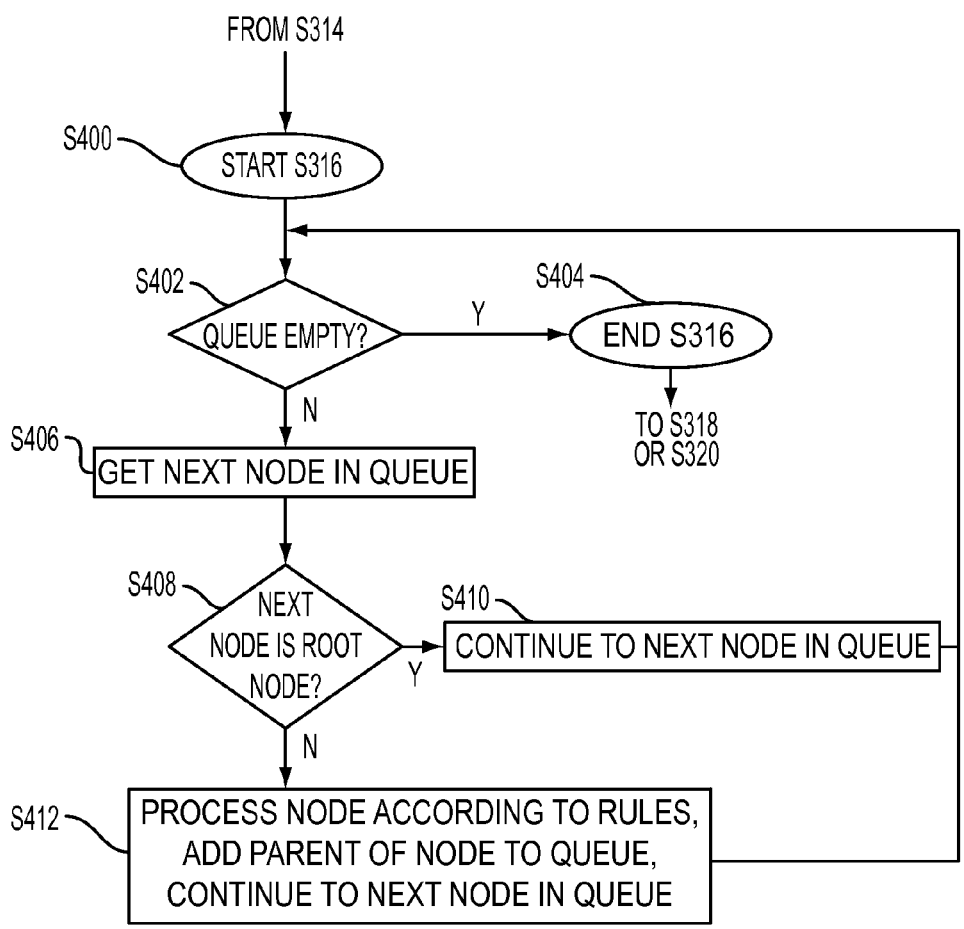

The algorithm to traverse the cover set is also illustrated in FIG. 4, described below.

A priority queue (pq) without repetitions is used to traverse the nodes in the defined order. The order in which non-ordered pairs are selected is not important: the priority property ensures that when a node v is visited, all descendants of v in the cover were visited before. This choice makes this algorithm run in time $\mathcal{O}((|cover|+n)\log(n))$, where the additional n factor is due to the leaves of $d_{k+1}$ and the logarithm factor is due to the complexity of insertion and deletion in the queue including detecting repetitions. The queue could be replaced by an array p of lists of node of maximal size n, where p[i] is the list of node whose depth is equal to i and an array added of boolean value where added[v] asserts if the node v was added to p. These two arrays can be updated in constant time and the additional cost in memory trades off with speed, making the cover traversal $\mathcal{O}(|cover|+n)$.

The properties of the nodes for each of the repeat classes given above are used to update those nodes belonging to each class. The set of children of nodes v is denoted as children(v). Furthermore, each node v also has two sets of symbols associated with it: the first, left context unique lc_unique contains those symbols c such that c is a left context of a leaf descending from v and there is no other leaf of v with the same left-context. The number of the different symbols in the set lc is represented by $|v.lc_{unique}|$ and is also stored in data structure 62. The second set, general left context, is disjoint to lc_unique and contains all other symbols which are a left-context of a leaf of v but are not in lc_unique. The number of the different symbols in the set lc is represented by |v.lc| and is also stored in data structure 62. Both sets are updated by updating both sets for the parent of each visited node, adding an additional |Σ| factor to the final complexity. With these definitions, each node can easily be updated with the following rules:

1. Rule Maximal: v is a max-repeat MR(S), iff: $|v.lc|+|v.lc_{unique}|>1$ AND $|children(v)|>1$
2. Rule LRCD: v is LRCD $(CD_{l,r}(S).)$ iff: $|v.lc|+|v.lc_{unique}|\geq l$ AND $|children(v)|\geq r$
3. Rule Supermaximal: v is supermaximal max-repeat SMR(S), iff: $|v.lc\_unique|=|children(v)|$
4. Rule Largest Maximal: v is largest max-repeat LMR(S) iff: $|v.lc\_unique|>0$ FIG. 4 shows the substeps of S316 of FIG. 3 in one example implementation. At S400, S316 of FIG. 3 begins.

At S402, priority queue 66 is checked to see if any nodes (suffixes of the new sequence) still remain to be processed. If all nodes have been processed, processing continues to S404 which ends step S316, and the method continues with FIG. 3 at S316 and/or S318.

If unprocessed nodes remain (queue is not empty), at S406, the next node is retrieved from the priority queue 66.

At S408, the next node is checked to see if it is the root. If so, processing continues to the next node in the queue at S410 and then to S402.

If the next node is not the root node, then it is processed according to which types of repeats are to be identified. Specifically, the node's left context and left context unique data structures are retrieved from data structure 62, and its right context is computed from how many children it has, and the rules described above are applied to determine whether or not to mark the node as a particular type or repeat.

The parent of the node is also added to priority queue 66. As mentioned above, the priority queue detects and ignores nodes that are repeats.

The next node is retrieved from the queue 66, and processing continues at S402.

Once all nodes in the priority queue are processed, processing continues to S320 or S318 in FIG. 3.

An Algorithm for Maximal Repeats

The case of maximal repeats is special because once a repeat becomes maximal, it cannot become non-maximal in future iterations. That is, once a node is marked as a maximal repeat, it will always be a maximal repeat. If a property of a node, once it becomes true, is always true, the property is referred to as invariant. Formally:

A class of substrings X is said to be invariant iff:

$$w \in X(s) w \in X(ss') \forall s, s \in \Sigma^*$$

Maximal repeats are invariant and therefore $X_{diff}(S,d)$ reduces to the set of newly added maximal repeats through the addition of d. Furthermore, maximal repeats have an additional property: if a node v is maximal, than all its ancestors are too. That is because the context diversity property of maximal repeats gets inherited upwards. Therefore, when traversing the cover, the algorithm can stop as soon as a node that is already maximal is reached. By induction, any of its ancestors will already be marked as such and none of them can cease to be maximal.

An optimization is possible for this case. It is not necessary to keep the sets of left-contexts. A single variable l suffices, which holds a negative value if the current node is maximal. If this is not the case, then all of its occurrences have a single left-context, and this symbol can then be stored in l.

LRCD repeats are also invariant, if x and y are constants. LRCD repeats are not invariant if x and/or y are functions which depend on the number of occurrences of the substring. Largest maximal repeats and super-maximal repeats are not invariant.

When using Ukkonen's incremental algorithm to construct the suffix tree and track maximal repeats, any newly created internal node can be checked at creation time (while the new document is being processed). The ancestors of any newly created node are also checked until no change is made. Because the only possible change is marking a non-maximal node as maximal, and because the traversal stops as soon as a node is not changed, the algorithm is optimal.

Counting Repeats

The traverse cover method can be used to count the number of occurrences of any internal node similar to the update of the membership of the classes of repeats. The number of occurrences of a repeat is the number of leaves in the subtree rooted at the node representing it. This value can be held as an additional variable associated with each node. In addition, each node may be associated with an auxiliary variable with the number of new leaves it has, as a consequence of the incorporation of the sequence of $d_{k+1}$ into the suffix tree. In a first traversal of the cover, each node updates this auxiliary variable of his parent. In a second traversal, each node updates its count of subtrees, adding the number of new leaves.

Without intending to limit the scope of the exemplary embodiment, the following examples illustrate application of the method.

EXAMPLES

The above method for incrementally computing repeats belonging to each maximal class is expressive enough to compute a large range of information, as exemplified by the incremental computation of the number of occurrences. For some of the classes of repeats, the method is not optimal, in the sense that the cover may be larger than the absolute minimum number of nodes that theoretically need to be inspected. However, the exemplary method avoids repeatedly traversing the tree for each different class of repeats.

The following data were used to analyze how much bigger the cover is than the optimal set. This analysis is restricted to the case of maximal repeats and considers its worst case behavior. Two simulated scenarios (documents originated from an independent identically distributed source and real-life natural language text) were analyzed. The data illustrates how |cover (S,d)| behaves with respect to the size of $MR_{update}$ (S,d) which reduces to {w∈d:w∈MR(S.d)} due to the invariant property of maximal repeats. Because the cover only contains nodes of the suffix tree, which are right-maximal, this means finding the substrings of d that are right but not left-maximal in S.d.

1. A Worst Case Scenario

Consider the document $d^{(k)}=a_1 a_2 \ldots a_k$ of length k over an alphabet of size k. To generate the worst case, the document set consisting of $\{d^{(k)}\}$ alone does not have any repeats. Updating with an exact copy $(D=\{d^{(k)}, d^{(k)}\})$ produces a set having only one maximal repeat ($d^{(k)}$ itself) which contains a linear number of left-maximal repeats $(a_1, a_1 a_2, \ldots, a_1 \ldots a_k)$: The complexity is the ratio:

$$\frac{|\text{cover}(S, d)|}{|MR_{update}(S, d)|} \in \Omega(|d|)$$

The data below examines whether this worst-case scenario reflects what likely happens in real sequences.

2. Simulations: IID

Documents were generated from a source emitting symbols independently and identically distributed (with uniform probability). To reduce variations due to different parameters, equally long documents were generated, of one million bytes each.

Figure 5:
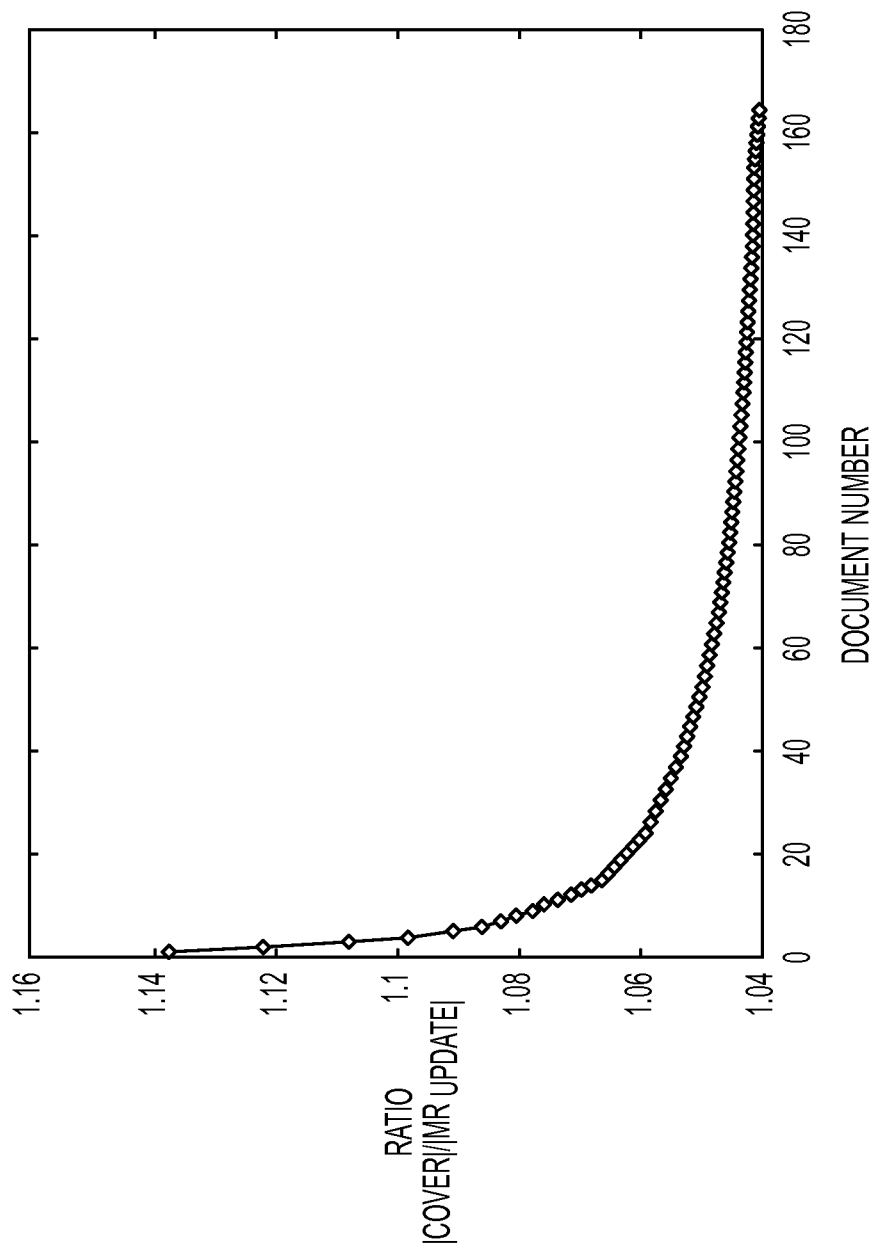
FIGS. 5-7 illustrate a ratio of a number of covered nodes to the number of updated nodes for different size alphabets.
Figure 6:
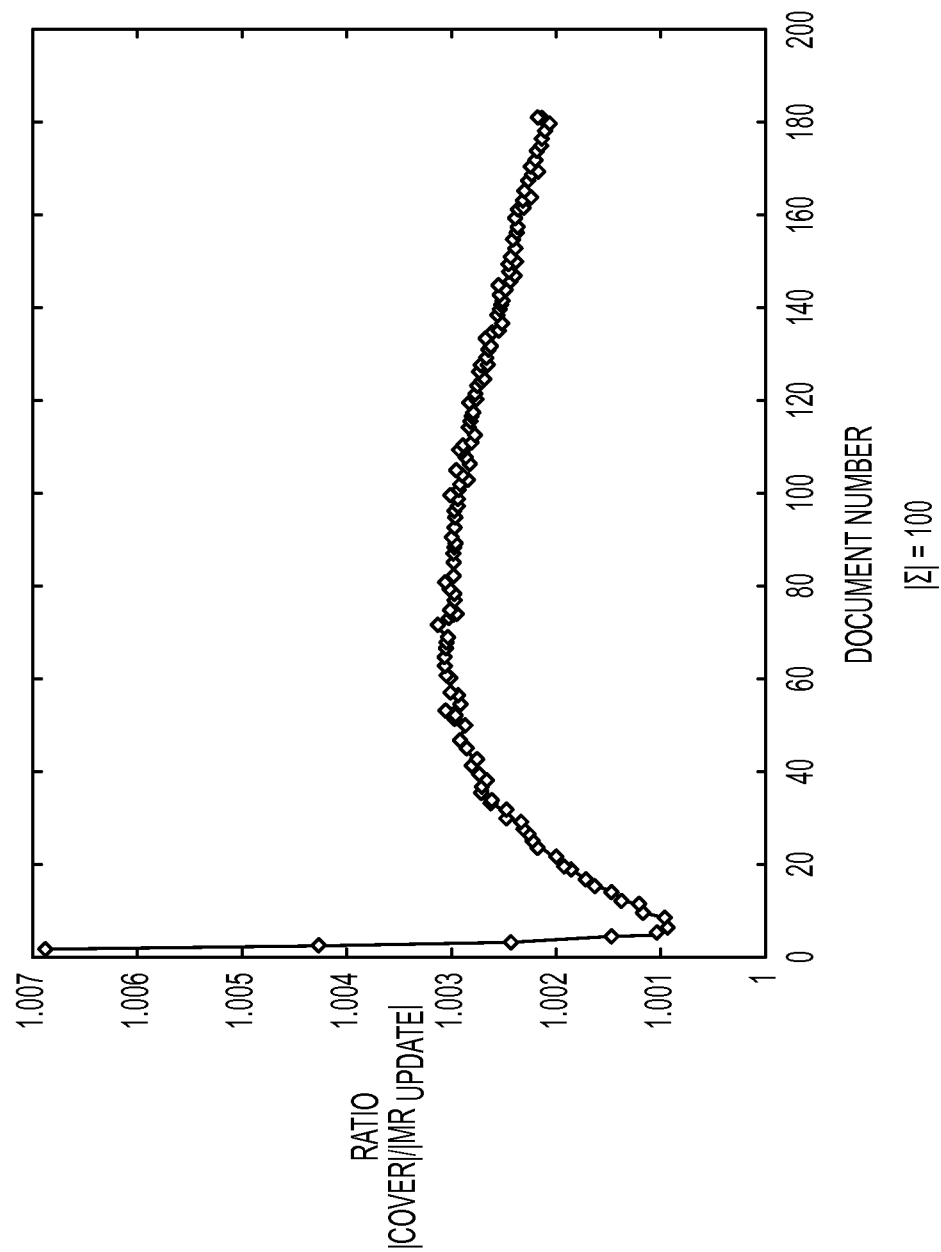
Figure 7:
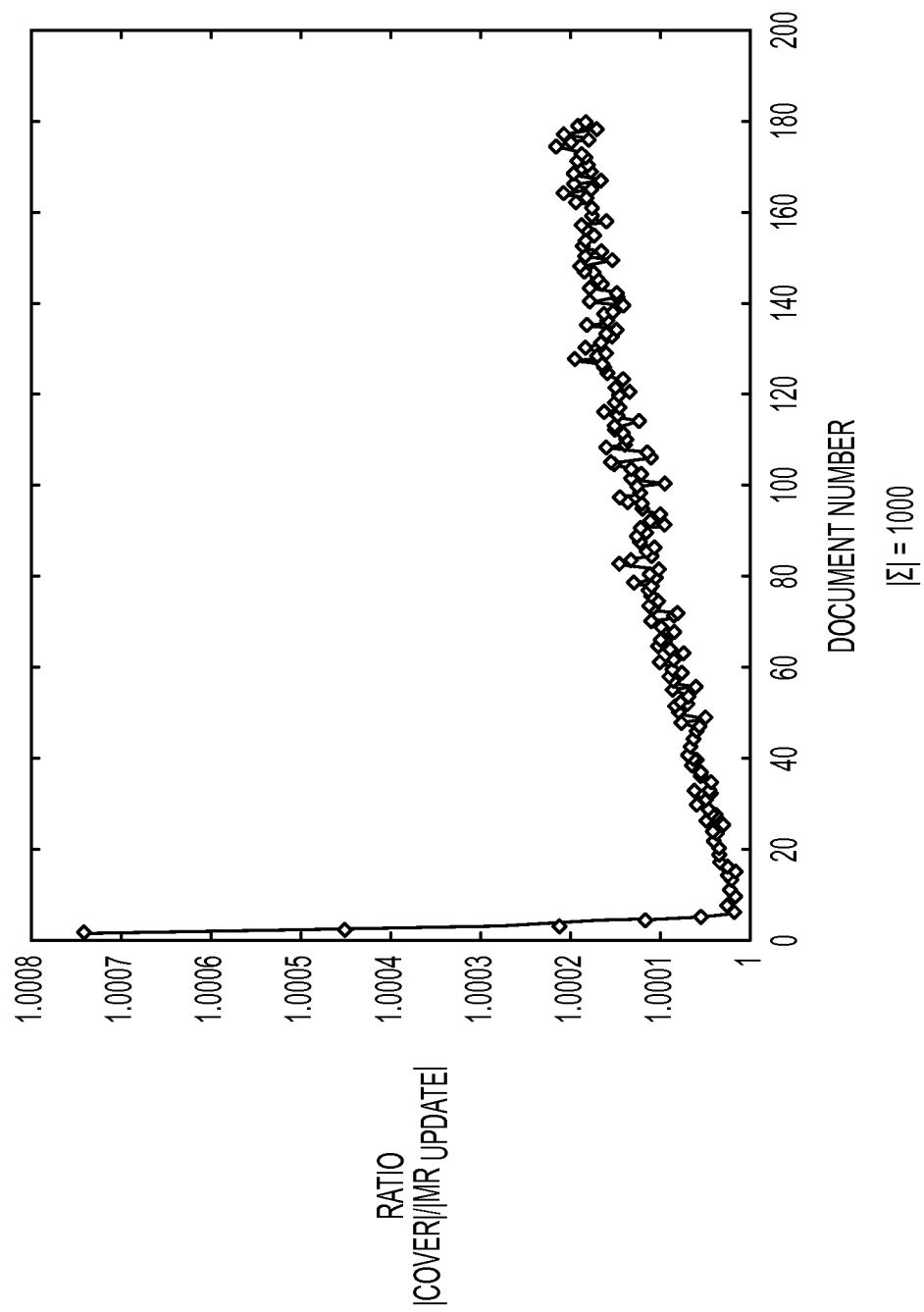

FIGS. 5, 6, and 7 plot the ratio $$\frac{|\text{cover}(S, d)|}{|MR_{update}(S, d)|}$$

for each document, using three different alphabet sizes (4, 100, and 1000) and an equiprobable source. While there are great relative variations, note that in absolute values, the changes are in the order of $10^{-3}$. The behavior using an alphabet size of 100 is probably the most typical, as it is similar to the periodic behavior of the expected number of nodes of a suffix tree and maximal repeats.

3. Simulations: English Text

Figure 8:
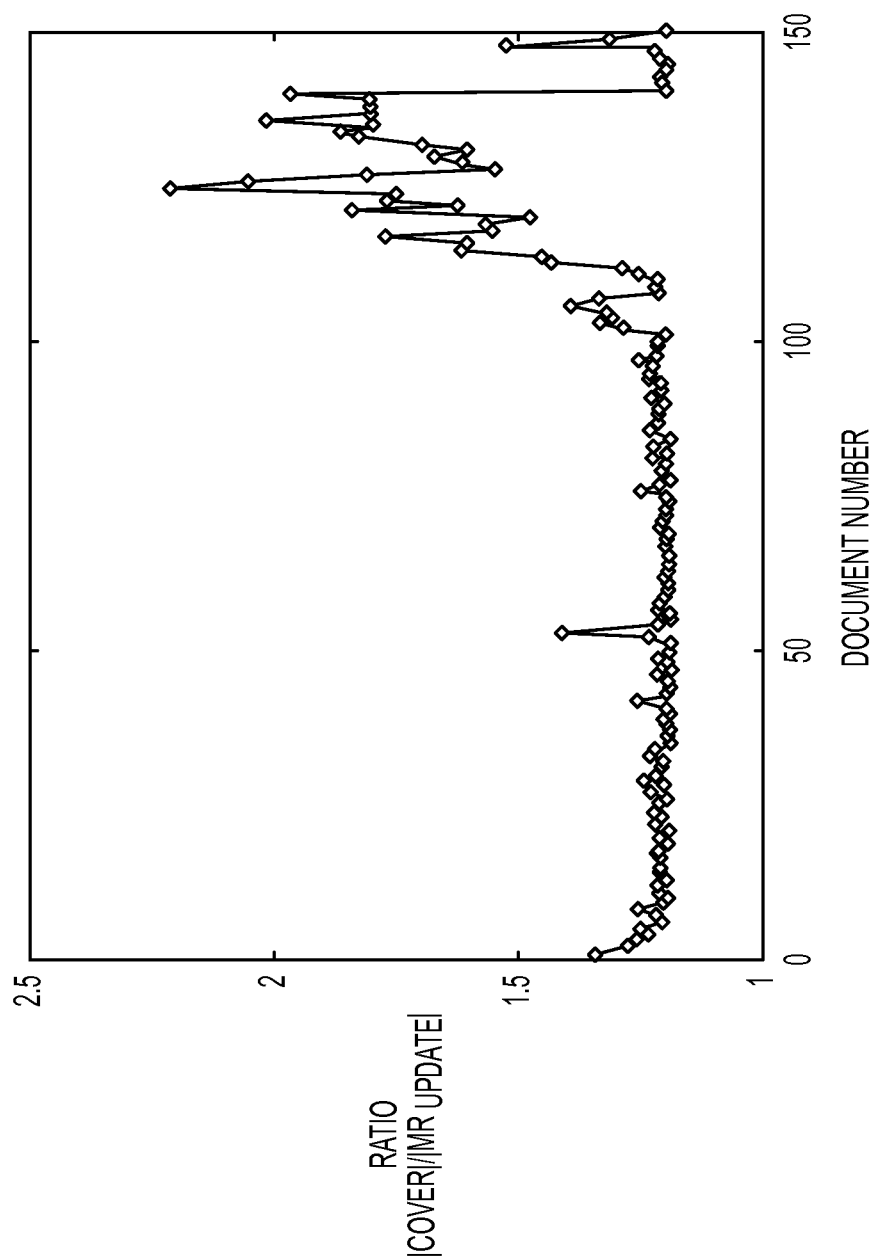
FIG. 8 illustrates the ratio of a number of covered nodes to the number of updated nodes for documents of an entire English web-based, collaborative, multilingual encyclopedia.
Figure 9:
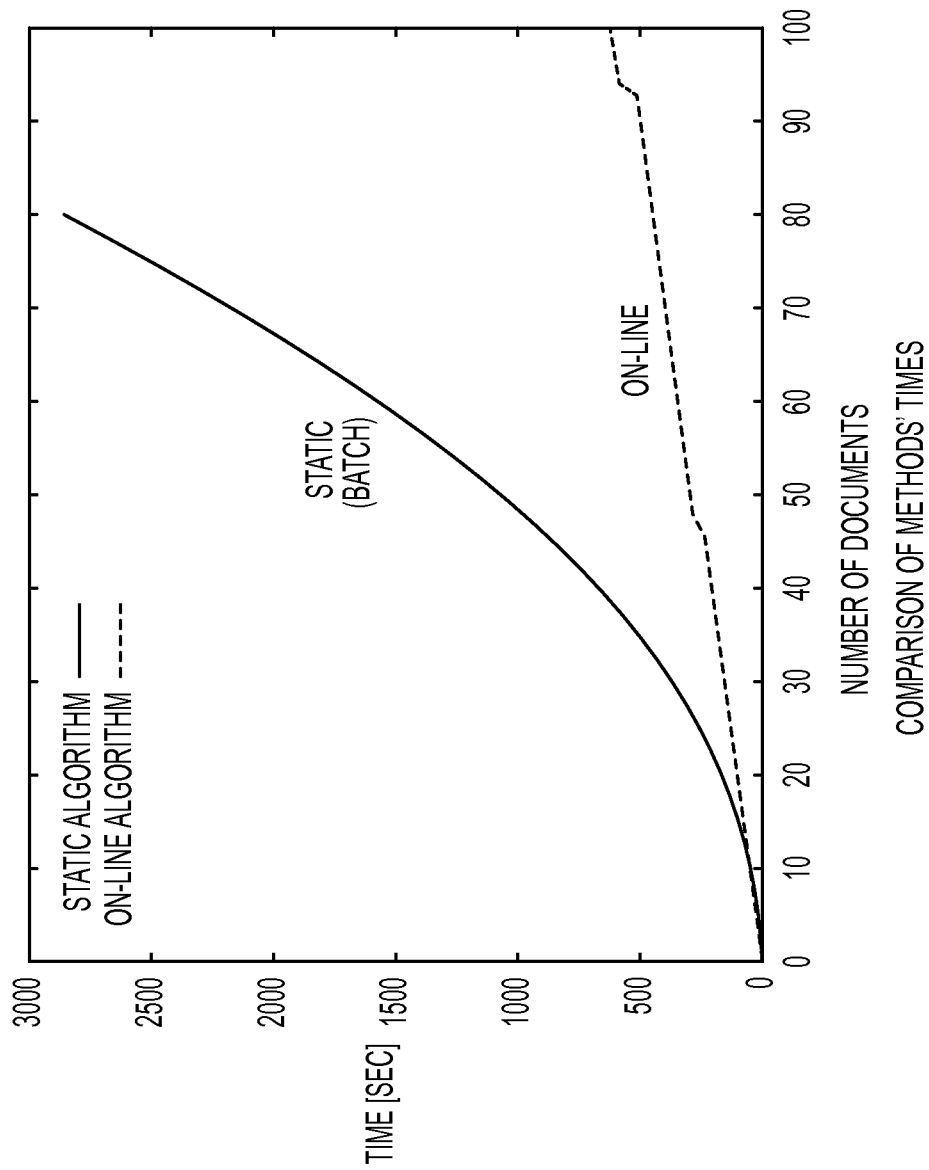
FIG. 9 illustrates the performance of a batch algorithm and an incremental algorithm.

The previous examples were repeated with a dump of a complete English web-based, collaborative, multilingual encyclopedia consisting of millions of documents. The encyclopedia text was split into documents of equal size. FIG. 8 illustrates the result: the ratio is higher than in the artificial sequences but still generally below 2, with a few exceptions. Varying the length of the documents did not impact this. The sudden peaks seem to belong to cases where long stretches of documents are repeated, coming closer to the worst-case scenario.

4. Speed Gain

FIG. 8 illustrates the time in seconds taken to calculate all maximal-repeats using a batch process which processes all documents each time a new document is added (first for string $d_1$, then for string $d_1.d_2$, and so on) and the time in seconds taken to get the same output result using the exemplary online, streaming method using the cover after adding each new document. As expected, the incremental solution is faster than processing each batch independently. The x-axis represents the number of documents concatenated (x=10 represents the string $S=d_1.d_2 \ldots d_{10}$). All documents have the same size (4.2 MB).

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method of characterizing a document in a collection comprising:

incrementally updating a suffix tree comprising:
for a first batch of documents in a collection, providing an initial suffix tree based on a first sequence of symbols drawn from an alphabet, the suffix tree comprising existing nodes representing respective subsequences occurring in the first sequence of symbols, the existing nodes being associated with information relating to membership of the subsequences in at least one class of repeat subsequences;
for a second batch of documents in the collection, receiving a second sequence of symbols drawn from the alphabet;
based on the second sequence of symbols, updating the initial suffix tree to form an updated suffix tree, the updating including adding new nodes representing subsequences occurring in the second sequence of symbols that are not represented by the existing nodes;
ordering the subsequences represented by the new nodes in a new node data structure, the order of the subsequences in the new node data structure being based on at least one of a length of the respective subsequence and a depth of the respective new node in the updated suffix tree; and processing the ordered new node data structure in an order based on the at least one of subsequence length and subsequence depth, the processing including updating the information relating to the at least one class of repeat subsequences associated with at least some of the nodes in the updated suffix tree;

for at least one of the documents in the collection, outputting information characterizing the at least one document, based on the updated information relating to the at least one class of repeat subsequences associated with the nodes in the updated suffix tree, and wherein at least one of the providing, receiving adding, ordering, and processing is performed with a computer processor.

2. The method of claim 1, wherein the initial suffix tree comprises a single root node and a plurality of child nodes, each child node being connected to the root node by a path, each child node being connected by paths to at least two other child nodes or being a leaf node which terminates a respective path, each leaf node being a suffix of the first sequence of symbols.

3. The method of claim 1, wherein the updated suffix tree comprises a single root node and a plurality of child nodes, each child node being connected to the root node by a path, each child node being connected by paths to at least two other child nodes or being a leaf node which terminates a respective path, each leaf node being a suffix of a sequence formed by concatenation of the first sequence of symbols and the second sequence of symbols.

4. The method of claim 3, wherein the new node data structure comprises a priority queue and wherein the processing of the new node data structure includes adding a parent of each new node to the priority queue that is not the root node of the updated suffix tree.

5. The method of claim 1, wherein the information relating to the at least one class of repeat subsequences comprises, for each of at least a subset of the nodes, at least one of:

unique left context data which stores a set of unique left context symbols which each occurs as a left context of exactly one of its descendant leaves; and general left context data which stores a set of general left context symbols which each occurs as a left context in more than one of its descendant leaves.

6. The method of claim 5, wherein the at least one class of repeat subsequences comprises a class of maximal repeats and each new node is labeled as a member of the class of maximal repeats if a sum of a number of its unique left context symbols and general left context symbols is greater than 1 and a number of nodes in the updated suffix tree which are children of the new node is greater than 1.

7. The method of claim 5, wherein the at least one class of repeat subsequences comprises a class of supermaximal repeats and each new node is labeled as a member of the class of supermaximal repeats if a number of its unique left context symbols is equal to a number of nodes in the updated suffix tree which are children of the new node.

8. The method of claim 5, wherein the at least one class of repeat subsequences comprises a class of largest maximal repeats and each new node is labeled as a member of the class of largest maximal repeats if a number of its unique left context symbols is at least 1.

9. The method of claim 1, further generating the first sequence of symbols from a collection of documents by concatenating the documents and inserting a separator between each pair of documents.

10. The method of claim 1, wherein the method further comprises outputting information based on the updated information relating to the at least one class of repeat subsequences associated with the nodes in the updated suffix tree.

11. The method of claim 10, wherein the output information comprises for each of at least one class of repeat subsequences, identifying subsequences of a combined sequence comprising the first sequence and the second sequence which are in the respective class of repeat subsequences.

12. The method of claim 10, wherein the output information comprises classifying a document corresponding to a part of a combined sequence comprising the first sequence and the second sequence based on the updated information relating to the at least one class of repeat subsequences associated with the nodes in the updated suffix tree.

13. The method of claim 1 wherein the symbols are selected from words and parts of speech.

14. The method of claim 1, wherein the receiving adding, ordering, and processing is repeated at least once, wherein the updating includes updating the updated suffix tree.

15. The method of claim 1, wherein the information relating to the at least one class of repeat subsequences comprises for each node, information indicating the membership of the node in the at least one class of repeat subsequences.

16. The method of claim 1, wherein documents are received in batches each of a set of subsequent batches being received at a later time than an earlier batch, the method comprises generating a second sequence of symbols for each subsequent batch of documents.

17. A method of incrementally updating a suffix tree comprising:

providing an initial suffix tree based on a first sequence of symbols drawn from an alphabet, the suffix tree comprising existing nodes representing respective subsequences occurring in the first sequence of symbols, the existing nodes being associated with information relating to membership of the subsequences in at least one class of repeat subsequences, wherein the at least one class of repeat subsequences comprises a class of both left and right context diverse repeats, values specifying a minimum number x of different left contexts and a minimum number y of different right contexts for a subsequence represented by a node to be considered a member of the class of both left and right context diverse repeats; and wherein the information relating to the at least one class of repeat subsequences comprises, for each of at least a subset of the nodes, includes:

unique left context data which stores a set of unique left context symbols which each occurs as a left context of exactly one of its descendant leaves; and general left context data which stores a set of general left context symbols which each occurs as a left context in more than one of its descendant leaves;

receiving a second sequence of symbols drawn from the alphabet;

based on the second sequence of symbols, updating the initial suffix tree to form an updated suffix tree, the updating including adding new nodes representing subsequences occurring in the second sequence of symbols that are not represented by the existing nodes, wherein each new node is labeled as a member of the class of both left and right context diverse repeats if a sum of a number of its unique left context symbols and general left context symbols is at least x and a number of nodes in the updated suffix tree which are children of the new node is at least y;

ordering the subsequences represented by the new nodes in a new node data structure based on at least one of a length of the respective subsequence and a depth of the new node in the updated suffix tree; and processing the new node data structure, the processing including updating the information relating to the at least one class of repeat subsequences associated with at least some of the nodes in the updated suffix tree, and wherein at least one of the providing, receiving adding, ordering, and processing is performed with a computer processor.

18. A system for updating a suffix tree, comprising:

a preprocessor configured for receiving batches of documents and generating respective sequences of symbols drawn from an alphabet based on the documents in the batches;

a suffix tree generator which generates an initial suffix tree based on a first of the sequences of symbols, the suffix tree comprising existing nodes representing respective subsequences occurring in the first sequence of symbols, the existing nodes being associated with information relating to membership of the subsequences in at least one class of repeat subsequences and updates the initial suffix tree to form an updated suffix tree based on a second of the sequences of symbols, the updating including adding new nodes representing subsequences occurring in the second sequence of symbols that are not represented by the existing nodes;

a cover traverser which orders the subsequences of the new nodes that are represented in the updated suffix tree in a new node data structure, the order of the subsequences in the new node data structure being based on at least one of a length of the respective subsequence and a depth of the respective new node in the updated suffix tree, and processes the ordered new node data structure in order, the processing including updating the information relating to the at least one class of repeat subsequences associated with at least some of the nodes in the updated suffix tree;

an output component which outputs a classification of at least one of the documents based on the updated information, and a computer processor which implements the preprocessor, suffix tree generator, and cover traverser.

19. The system of claim 18, wherein the cover traverser identifies, for each of at least a subset of the nodes in the updated suffix tree, at least one of:

unique left context data which stores a set of unique left context symbols which each occurs as a left context of exactly one of its descendant leaves in the updated suffix tree; and general left context data which stores a set of general left context symbols which each occurs as a left context in more than one of its descendant leaves in the updated suffix tree; and the at least one class of repeat subsequences comprises at least one of:

a) a class of maximal repeats and wherein each new node is labeled as a member of the class of maximal repeats if a sum of a number of its unique left context symbols and general left context symbols is greater than 1 and a number of nodes in the updated suffix tree which are children of the new node is greater than 1;

b) a class of both left and right context diverse repeats, and wherein the system stores values which specify a minimum number x of different left contexts and a minimum number y of different right contexts for a subsequence represented by the node to be considered a member of the class of both left and right context diverse repeats and wherein each new node is labeled as a member of the class of both left and right context diverse repeats if a sum of a number of its unique left context symbols and general left context symbols is at least x and a number of nodes in the updated suffix tree which are children of the new node is at least y;

c) a class of supermaximal repeats and wherein each new node is labeled as a member of the class of supermaximal repeats if a number of its unique left context symbols is equal to a number of nodes in the updated suffix tree which are children of the new node; and d) a class of largest maximal repeats and wherein each new node is labeled as a member of the class of largest maximal repeats if a number of its unique left context symbols is at least 1.

20. A method of incrementally updating a suffix tree, the suffix tree comprising nodes and having a single root node, each node being associated with data indicating the membership of the node in a maximal repeat class, each node further including a left context data element which holds either a singular left context which is a symbol which appears immediately before the suffix corresponding to the node, no other symbols appearing before the suffix, or a value, referred to as node_maximal, which indicates the node is maximal and there is more than one symbol appearing before the suffix corresponding to the node, the method comprising:

constructing a suffix tree based on at least one already received sequence of symbols drawn from an alphabet, the suffix tree comprising nodes corresponding to suffixes of the already received sequence of symbols;

receiving a new sequence of symbols from the alphabet;

adding new nodes to the suffix tree based on the new sequence and tracking the new nodes with a new node data structure, each new node of the new nodes corresponding to a suffix of the new sequence; and setting the left context data element of each new node to be node_maximal if more than one symbol appears before the suffix corresponding to the new node or setting the left context data element to be a symbol which is the only symbol which appears immediately before the suffix corresponding to the new node, and adding each new node in the updated suffix tree to the new node data structure if the new node has a left context data element value of node_maximal;

ordering the new nodes represented in the new node data structure in an order which is based on the length of the suffix corresponding to each new node and placing the ordered new nodes in a priority queue; and processing the priority queue until the priority queue is empty, the processing including, if the new node is not the root node and if a parent node of the new node has a left context which is not node_maximal, then setting the left context to node_maximal and adding the parent node to the priority queue.

* * * * *